United States Patent [19]

McCullough et al.

[11] Patent Number: 4,794,273

[45] Date of Patent: Dec. 27, 1988

[54] ON/OFF CONTROL SYSTEM FOR POWER OPERATED HAND TOOLS

[75] Inventors: Timothy J. McCullough, Vermilion; Arvin B. Simon, Lorain, both of Ohio

[73] Assignee: Food Industry Equipment International, Inc., Lorain, Ohio

[21] Appl. No.: 102,324

[22] Filed: Sep. 29, 1987

[51] Int. Cl.[4] ............................ H01H 3/00; F16D 3/06
[52] U.S. Cl. ........................................ 307/139; 30/276; 361/181; 361/189; 200/157; 192/131 R; 307/326; 307/116
[58] Field of Search ................ 30/276, 348; 307/139, 307/326, 140, 328, 116; 361/181, 182, 189, 179, 190, 203; 192/131 R; 200/157, DIG. 1; 340/649, 635; 324/61 R, 61 P; 318/446

[56] References Cited

U.S. PATENT DOCUMENTS

| | | | |
|---|---|---|---|
| 2,827,657 | 3/1958 | Bettcher | 17/1 G |
| 3,024,532 | 3/1962 | Bettcher | 30/276 |
| 3,269,010 | 8/1966 | Bettcher | 30/276 |
| 3,651,391 | 3/1972 | Vogelsberg | 200/DIG. 1 X |
| 3,764,861 | 10/1973 | Orris | 307/116 X |
| 3,852,882 | 12/1974 | Bettcher | 30/276 |
| 3,896,425 | 7/1975 | Erichsen | 343/832 X |
| 4,324,043 | 4/1982 | McCullough | 30/276 |
| 4,380,721 | 4/1983 | Bullock et al. | 307/116 X |

Primary Examiner—Eugene R. LaRoche
Assistant Examiner—Seung Ham
Attorney, Agent, or Firm—Michael Sand Co.

[57] ABSTRACT

An electronic ON/OFF control system for use on a powered hand tool to ensure operator safety and ease of operation. The hand tool is driven either by an electric motor driven, flexible drive shaft or a source of pressurized air supplied to the hand tool through a supply line. A low power frequency is applied alternately to the hand tool and power supply line. Appropriate circuitry detects changes in the frequency of the applied signal caused by an operator grasping the hand tool and power supply line and the sequence in which the two components are grasped. If the hand tool is being grasped when the drive shaft or supply line is subsequently grasped a signal is supplied to a power control unit which actuates the power source for the hand tool. The power control unit maintains the hand tool energized after releasing of the operator's grasp on the on the power supply line and automatically de-energizes the hand tool upon the operator releasing his grasp on the hand tool.

32 Claims, 5 Drawing Sheets

ON/OFF CONTROL SYSTEM FOR POWER OPERATED HAND TOOLS

TECHNICAL FIELD

The invention relates to control systems for power operated hand tools and in particular to a control system for a meat cutting knife. More particularly the invention relates to such a control system which starts the rotation of the cutting blade of the trimming knife upon the operator grasping the handpiece and power supply line in a predetermined sequence without any further actuation of any ON/OFF control switch.

BACKGROUND ART

Various types of hand tools have been devised for performing various operations such as power actuated drills, nailers, grinders, stitchers, meat cutting and trimming tools, etc. which are operated by a power driven flexible drive shaft, or an air motor mounted within the hand tool and powered by pressurized air supplied to the motor by a fluid supply line. The flexible drive shafts are driven by an electric motor located remote from the hand tool. Of these various hand tools power driven meat cutting knives have been used extensively in the meat industry to facilitate the removal of meat from a carcass, primarily in a trimming operation, or for removing the meat remains from the bones. The present invention is described below with particular reference to such meat trimming knives, although the control system is adaptable for other power operated hand tools and need not be limited to such meat trimming knives.

Prior examples of electrically driven trimming knives using flexible drive shafts are shown in U.S. Pat. Nos. 3,269,010; 4,179,063; 4,178,683; 4,198,750; 4,494,311 and 4,575,938. In these electrically driven knives, the flexible drive shaft is connected at one end to the electric motor which is located adjacent to the work area and enters the rear of the handle portion of the knife and extends through the handle bore and terminates in a squared end. The squared end is engaged in a complementary-shaped opening formed in the rear of a pinion gear which rotatably drives the cutting blade mounted on the front of the handle. In pneumatically driven knives, such as shown in U.S. Pat. No. 3,852,882, the output shaft of the air motor is engaged through a gear assembly with the rear opening of the pinion gear for driving the gear and correspondingly driving the cutting blade in a similar manner as does the pinion gear of the electric knives.

These power driven tools, or trimming knives as they are generally referred to in the industry, whether electrically or pneumatically driven, consist of a tubular handle terminating in a generally arcuate-shaped front end and have a hollow bore extending throughout the longitudinal length of the handle. An annular blade holder is attached to the arcuate front end of the handpiece and has a ring blade removably mounted thereon by various mounting arrangements. The blade is formed with gear teeth extending around the top edge which are in driving engagement with the pinion gear rotatably mounted within the front end of the handpiece adjacent the ring blade.

These meat trimming knives, whether pneumatically or electrically driven, are used for relatively long periods of time by an operator at a work station in a relatively cold environment, which is required to maintain the meat being trimmed in a safe condition. The operator usually is positioned at a work station and the meat is continuously brought to the work station on a conveyor, or the like, for trimming the meat from the carcass or bones by the operator.

An operator will start and stop the rotation of the cutting blade of the electrically driven knife by actuating the main switch on the electric drive motor mounted overhead of the work station. This necessitates the operator reaching overhead each time he or she wishes to start and stop the electric drive motor and, consequently, the cutting blade. Due to the amount of motion that must be performed by the operator to start and stop the trimming knife, the operator usually will permit the main electric motor and knife blade to continue to run between brief pauses in the trimming of meat from different carcasses as they are brought to the operator. This requires the operator to continually maintain his grip on the handle of the trimming knife with sufficient pressure to prevent the handpiece from twisting or turning in his hand. This continuous pressure over extended periods of time, or throughout a usual work shift, fatigues the operator which decreases the amount of production or meat trimmed during a work shift. Also, the handles of the trimming knives, whether electrically operated or pneumatically operated, become coated with grease from the fat of the meat being trimmed, requiring sufficient pressure to be maintained on the handle to prevent the handle from turning in the operator's hand due to the rotational motion applied on the handle by the energy of the rotating blade.

Preferably an electric switch is not mounted on the handpiece itself for controlling the overhead electric motor due to the safety involved since the handpiece is usually used in a wet and damp environment and must be cleaned during and after each work shift for sanitary reasons. Therefore, it is impractical to have an electric control switch on the handpiece itself, which would permit an operator to conveniently stop and start the drive motor during momentary work stoppages throughout a work shift.

The pneumatic driven trimming knives have the disadvantage of requiring a control lever mounted on the handpiece which must be maintained in a depressed condition to maintain the air motor in an On condition. Such levers require the use of various sealing valves which, after periods of time, occasionally will leak causing a self-refrigeration effect due to the escaping of pressurized air around the sealing rings. This further increases the cooling or chilling of the operator's hand adding to the discomfort and fatigue. It has been found that operators will occasionally lock the control lever in a permanently ON position in order to eliminate maintaining the lever in the depressed position which results in an unsafe condition.

Futhermore, it is important that when actuating the power source for rotating the cutting blade of either the electrically or pneumatically operated handpieces that the operator have at least one hand on the handpiece with the other hand being at a sufficient distance from the blade to prevent accidental cutting upon starting the drive motor.

Another problem with prior art electric and pneumatic driven knives having a usually manually actuated ON/OFF switch is that the continuous running of the flexible drive shaft and pneumatic motor throughout much of the work shift increases the maintenance cost of the knife. This continuous operation requires more frequent replacement of the cutting blade, the blade housing, drive pinion gear, flexible drive cable and outer casing since the blade is rotating continuously even when the knife is not being actually used by the operator to trim the meat.

Therefore, the need exists for an improved ON/OFF control system for power operated hand tools, and in particular for power operated meat trimming knives, both electrically and pneumatically driven, which enables the knife to be stopped and started in a simple, economical, efficient, and particularly in a safe manner.

DISCLOSURE OF THE INVENTION

Objectives of the invention include providing an improved ON/OFF control system for power operated hand tools, and in particular for a meat trimming knife in which the knife is driven by a flexible drive shaft extending from an electric drive motor mounted remote from the handpiece, or driven by an air motor mounted within the handpiece and connected to a source of pressurized fluid through a supply hose extending from the handpiece to the pressurized fluid supply.

A further ojective of the invention is to provide such an improved control system wiich enables the operator to start and stop the air motor or rotation of the drive shaft without actuating a main ON/OFF switch of the remotely mounted electric motor, or without releasing the air motor control lever, enabling the operator to occasionally relax his grip on the handpiece and flex his hands to relieve pressure and reduce fatigue, thereby increasing efficiency of the trimming operation and in an extremely safe and efficient manner.

Still another objective of the invention is to provide such an improved control system for a meat trimming knife in which one hand of the operator is required to be maintained on the handpiece with the other hand engaging the power supply line of either the electrically driven cable or pressurized air line, thereby increasing the safety to the operator by reooving his hands from adjacent the trimming knife; and in which only the normal grasping pressure is required by the operator on the knife to maintain the knife in its ON position once the power supply to the handpiece is actuated, freeing the operator's other hand for movement of the meat during trimming.

Another objective of the invention is to provide such an improved control system in which the rotating annular cutting blade of the trimming knife, whether electrically or pneumatically driven, stops rotation almost instantaneously upon the operator releasing his grasp on the handpiece since there is negligble inertia mass in the rotating cable and/or air motor to dissipate; and in which such low mass that must be placed back into rotation, provides nearly instantaneous startup with very little power consumption upon actuation of the control system by the operator.

A further objective of the invention is to provide such an improved control system in which there are no electrical switches or components that are located at the handpiece thereby increasing safety for the operator, and which permits the handpiece to be cleaned and maintained in a sanitary condition without concern for such electrical components, and which provides a system that increases the safety for the operator since the rotating blade is stopped almost immediately should the operator drop the handpiece thereby providing a "deadman switch" for the handpiece.

A still further objective of the invention is to provide such an improved control system for a meat trimming knife in which the components can easily be incorporated into a usual electric or pneumatic driven handpiece with minor modifications and, most importantly, the improved system does not materially affect the trimming operation or procedure of the operator nor require extensive retraining for the operator to use the meat trimming knife equipped with the new ON/OFF control system.

Still another objective of the invention is to provide such an improved ON/OFF control system which uses a low power, radio frequency control signal, which signal does not interfere with any surrounding communication or other electronic equipment, and which does not create any discernable interference with surrounding radio transmissions and receptions.

A still further objective of the invention is to provide such an improved ON/OFF control system in which the main electronic control circuitry is contained in one or more printed circuit boards which are easily mounted in or adjacent to the electric drive motor or pressurized air supply system, which occupies only a minimal amount of space and requires a minimal amount of power consumption, and which can be provided with circuitry for compensating for changes in the ambient temperature and surrounding extraneous noises and frequencies present in many work areas caused by other types of electrical and mechanically moving equipment.

A further objective is to provide such an improved ON/OFF control system in which the operator must first grasp the handpiece and then grasp the power supply line connected to the handpiece in order to start the handpiece thereby ensuring that both hands are out of the way of the cutting blade, after which the power supply line can be released, and in which the cutting knife will not start unless this sequence is followed.

These objectives and advantages are obtained by the improved control system of the invention the general nature of which may be stated as a control system for a power operated hand tool which is connected to a power source by a power supply line extending between the power source and the hand tool, in which said system may be stated as including, first means for applying a signal alternately to the hand tool and supply line; second means for detecting a change in said signal upon a user grasping the hand tool and supply line; third means for determining the sequence of said user grasping the hand tool and supply line; and fourth means for connecting the hand tool to the source of power upon the proper grasping sequence being determined by said third means.

These objectives and advantages are further obtained by the improved method of the invention the general nature of which may be stated as a method for actuating and deactuating a power driven hand tool which is connected to a power source by power supply line by a user grasping the hand tool and power supply line in a predetermined sequence; wherein said method includes the steps of applying a signal alternately to the hand tool and power supply line; manually grasping the hand tool and power supply line in a predetermined sequence; detecting a change in said signal upon a user grasping the hand tool and supply line; determining the sequence of the hand tool and supply line being grasped; and actuating the hand tool by connecting it to the power source upon the proper grasping sequence being determined.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

The improved ON/OFF control system of the invention for use with power operated tools is shown in the accompanying drawings and is described below in relationship to an electrically driven meat trimming knife indicated generally at 1, and shown particularly in FIGS. 1-6, and for a pneumatic meat trimming knife indicated generally at 2, and shown particularly in FIGS. 7-12. Knives 1 and 2 are representative of the various types of hand tools which can be either electrically driven by a flexible drive shaft as described below, or pneumatically driven by a pneumatic motor mounted within the handpiece, also described below.

Figure 2:
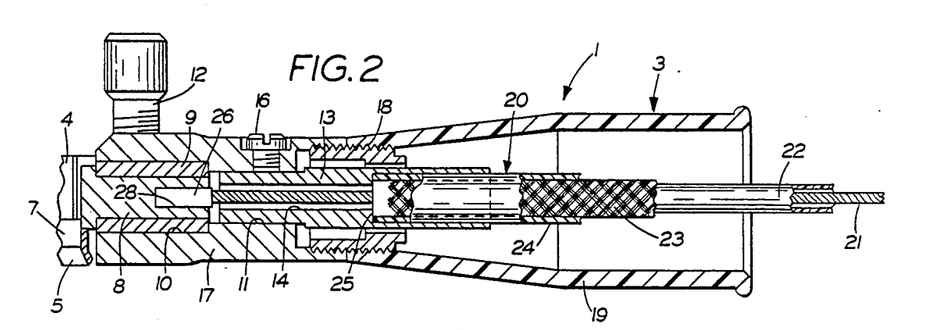
FIG. 2 is an enlarged fragmentary sectional view with portions broken away and in section, of the electrically driven meat trimming knife of FIG. 1 operated by the improved control system ofthe invention.

Electric meat trimming knife 1, as represented in FIG. 2, is of the type shown particularly in U.S. Pat. Nos. 4,324,043; 4,494,311 and 4,575,938. The particular electric knife construction as shown in FIG. 2, includes a tubular handpiece indicated at 3, which has an arcuate-shaped blade attachment 4 mounted on a front end thereof for rotatably supporting a usual ring-shaped cutting blade 5. The blade is formed with a plurality of gear teeth 7 formed about the upper end which are in driving engagement with a pinion drive gear 8. Gear 8 is rotatably mounted within a sleeve bearing 9 seated in a front portion 10 of a main bore 11 which extends throughout handpiece 3. A grease reservoir 12 is mounted on tubular handpiece 3 and communicates with front bore portion 10 and contains a supply of edible grease which is discharged onto bearing sleeve 9 in a usual manner well known in the art.

A ferrule 13 which is of a usual tubular configuration and formed with a through bore 14, is retained within the handpiece bore by a set screw 16. Also, a threaded coupler 18 connects rear handle portion 19 with the front blade attachment portion 17.

The power for rotating blade 5 is supplied by a power supply line indicated generally at 20. Supply line 20 includes an interior flexible drive shaft 21 which is rotatably mounted and housed within a inner sleeve 22 formed of a dielectric material such as Nylon, which is stabilized by a metallic braid 23 which is wrapped about tube 22. Drive shaft 21, dielectric tube 22 and braid 23 are all contained within an outer covering 24 of a food grade plastic material. Outer cover 24, braid 23 and dielectric tube 22 terminate at an annular stepped shoulder 25 of ferrule 13. Drive shaft 21 extends through ferrule bore 14 and terminates in a squared end 26 which extends into a complementary-shaped opening 28 formed in the rear of pinion gear 8 and provides the driving connection between drive shaft 21 and cutting blade 5 in a conventional manner.

The particular electric knife construction described above may vary without affecting the concept of the invention, and is representative of a preferred type of flexible shaft driven knife. The other end of power supply line 20 is connected to an electric motor indicated generally at 29, which is supported by a bracket 30 generally above an operator's shoulder suspended from a ceiling or the like. The length of supply line 20 generally varys between four and five feet depending upon the size of the unit in operation and the particular meat cutting plant facility in which the trimming knife is being used.

Figures 3, 6:
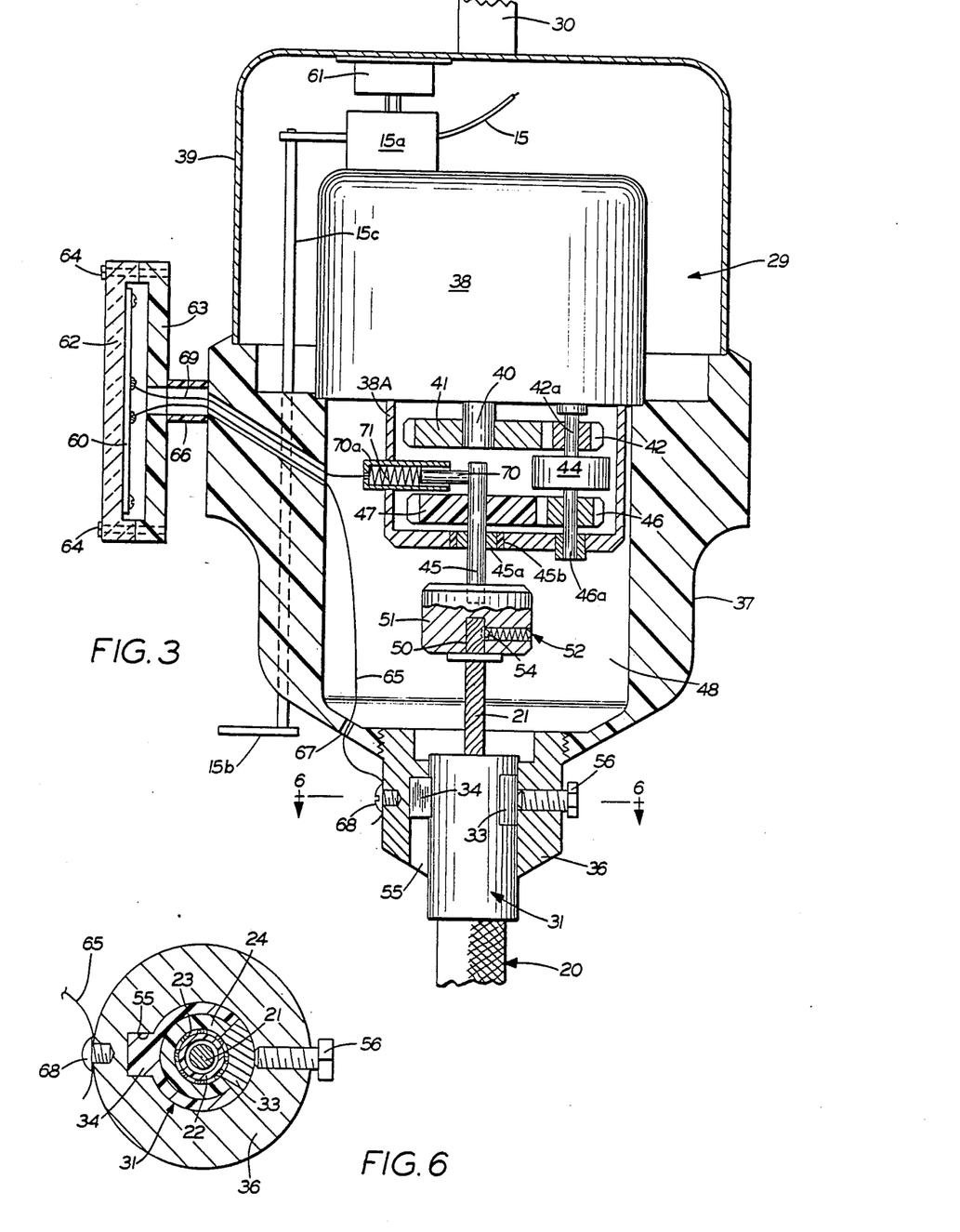
FIG. 3 is an enlarged fragmentary sectional view of the electric drive motor of FIG. 1 having portions of the improved control system mounted therein.
FIG. 6 is an enlarged fragmentary sectional view taken on line 6—6, FIG. 3.
Figure 4:
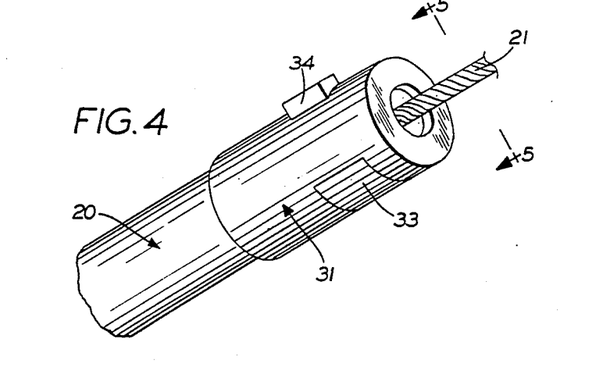
FIG. 4 is an enlarged fragmentary perspective view showing the terminal end of the flexible drive shaft of the electric knife which is connected to the electric drive motor of FIG. 3.
Figure 5:
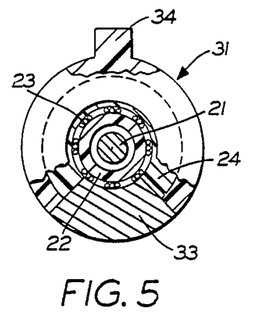
FIG. 5 is a sectional view taken on line 5—5, FIG. 4.

Referring to FIGS. 3, 4 and 5, the opposite end of power supply line 20 from knife 1 has a terminal connector indicated generally at 31 mounted thereon. Connector 31 has a cylindrical configuration and has an arcuate contact segment 33 imbedded within the plastic material of connector 31, which is in electrical contact with metal braid 23. An alignment key 34 is molded integrally with terminal connector 31 and extends outwardly therefrom for positioning the end of power supply line 20 within the end of motor 29 (FIG. 3).

Motor 29 is of a usual construction having an outer housing 37 and a housing cover 39 which contains an electric drive motor 38. Motor 38 is connected to a usual source of electric power, preferaby 120/240 volts AC by an electric line 15, and has a output drive shaft 40. A manually operated main ON/OFF control switch 15a is mounted within housing cover 37 and is controlled by a lever 15b which is connected to switch 15a by a shaft 15c. Output shaft 40 is connected through a pair of gears 41 and 42, and an electrically operated clutch 44 to a stub shaft 45 by a second pair of gears 46 and 47. Gear 47 is secured to stub shaft 45 and is constructed of a suitable dielectric material such as nylon to prevent electrical contact between shaft 45 and housing wall 38a. Alternately gear 47 can be constructed of steel and affixed to shaft 45 using a suitable dielectric material to prevent electrical contact between shaft 45 and gear 47, and gears 42 and 46 are secured to shafts 42a and 46a, respectively. The particular size and arrangement of gears 41, 42, 46 and 47 may vary depending upon the particular output speed of motor 38 and the desired rotational speed to be transferred to drive shaft 21. Bearing 45a rotatably supports shaft 45 and a dielectric insulator 45b prevents shaft 45 from making electrical contact with gear housing 38a.

Drive shaft 21 extends beyond terminal connector 31 and into compartment 48 located within outer housing 37. Shaft 21 extends into an opening 50 formed in a terminal block 51 which is rigidly mounted on the end of stub shaft 45 (FIG. 3). A spring biased ball detent indicated generally at 52, is mounted within block 51 with ball 54 being engaged with shaft 21 to maintain shaft 21 in tight abutting relationship with the surrounding wall of opening 50 to ensure a solid electrical contact between metal terminal block 51 and shaft 21, the purpose of which is discussed further below.

Terminal connector 31 of power supply line 20 is secured in an end bell 36 of the motor housing by alignment key 34 which is slip fitted within a complementary-shaped slot 55 (FIG. 6) formed in end bell 36. A thumb screw 56 is engaged with arcuate contact segment 33 to provide a good electrical contact between segment 33 and correspondingly with metal braid 23. End bell 36 is formed of metal whereas outer housing 37 and cover 39 may be formed of a high strength plastic material.

Figure 13:
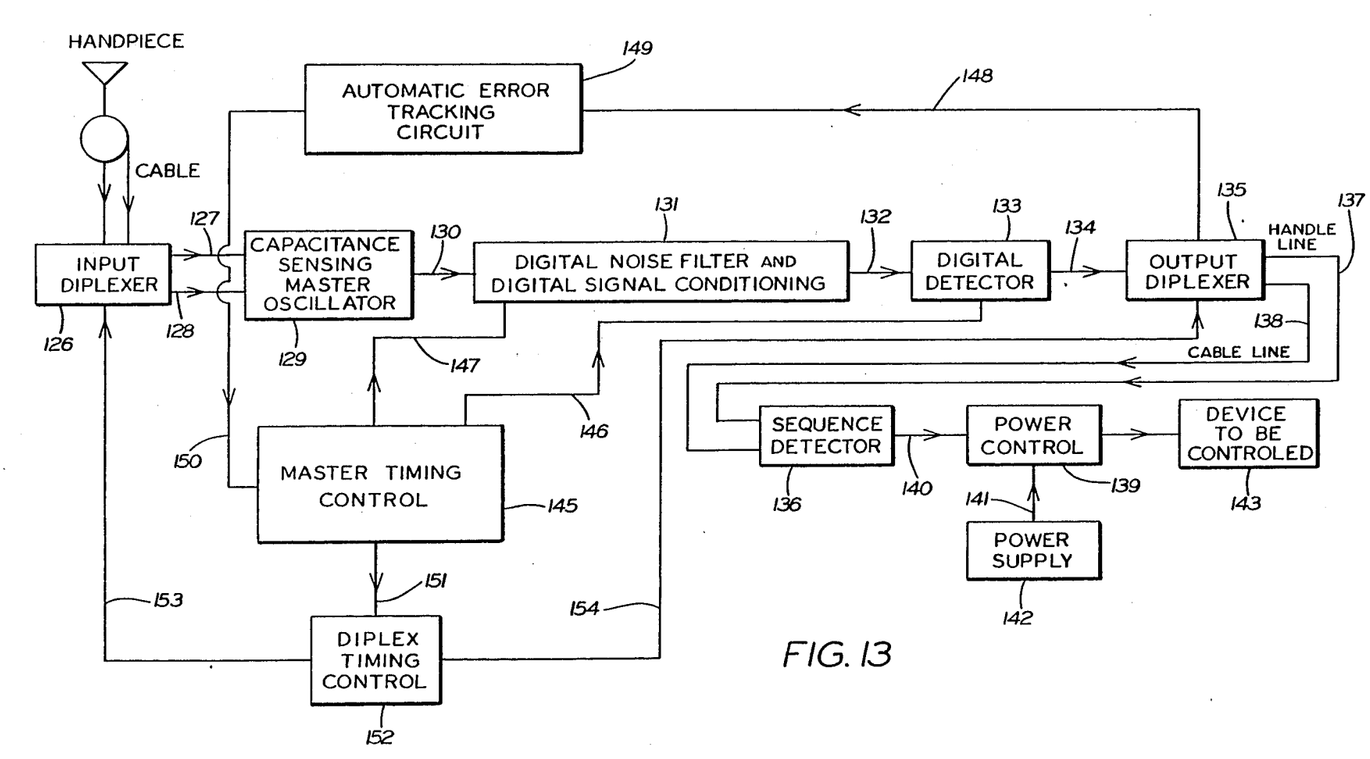
FIG. 13 is a schematic block diagram showing the electronic control circuitry of the improved control system.

The electronic circuitry of the improved control system which is shown in block diagram form in FIG. 13, will be incorporated into one or more circuit boards, the main circuit board of which is indicated at 60 with a power supply board 61 being mounted on the top of motor 38 within housing cover 39. Power supply board 61 is relatively unaffected by the high temperatures which will occur within the motor housing and, therefore, can be mounted within the housing without affecting its operation. Printed circuit board 60 may be clamped between a pair of housing forming plates 62 and 63 by screws 64. An output conductor 65 extends through a mounting nipple 66 and through housing compartment 48 and passes through a hole 67 formed in housing 37 for connection to a screw 68 which electrically connects conductor 65 with power supply line braid 23 through thumb screw 56 and contact segment 33.

Another conductor 69 extends from circuit board 60 through nipple 66 and is connected to stub shaft 45 by a commutator brush 70 which is maintained in engagement with shaft 45 by a spring 71. Brush housing 70a must be electrically insulated from gear housing 38a so that the improved ON/OFF control system only senses changes in the handpiece connected to drive shaft 21. This provides electrical contact between flexible drive shaft 21 and circuit board 60 through shaft 45 and terminal block 51. As discussed above, the other end of drive shaft 21 is connected to the handpiece through pinion gear 8 and front blade attachment portion 19.

The improved ON/OFF control system of the invention is shown in FIGS. 7–12 with pneumatic operated meat trimming knife 2. Pneumatic trimming knife 2 may be of the type as shown in U.S. Pat. No. 3,852,882 or a knife construction similar thereto. Knife 2 includes a tubular handle or handpiece 73 having a hollow bore 74 extending throughout in which is mounted a usual pneumatic air motor 75. The output shaft of motor 75 is connected to pinion drive gear 8 which is engaged with cutting blade 5 in the same manner as discussed above with regards to electric knife 1. The air motor output shaft is connected to the pinion gear through a variety of gearing arrangements such as a parallel idler gear arrangement as shown in pending application Ser. No. 102,325 being filed concurrently herewith. The particular gearing by which the air motor output shaft is connected to pinion gear 8 may vary without affecting the concept of the invention, and is well known in the art and, therefore, is not shown in detail.

Motor 75 is a usual pneumatic or air motor of the type well known in the art and, therefore, is not described in detail. One particular type may be a Model 15E1R manufactured by Gardner Denver Corporation of Denver, Colo., or may be of the type shown in U.S. Pat. No. 3,852,882. Portions of motor 75 are shown diagrammatically in FIG. 12 in which an outer wall, or cover 77 thereof, is formed with a plurality of exhaust openings 78. Motor 75 is mounted within handpiece bore 74 with sufficient clearance to provide an annular space 79 between motor cover 77 and the inner cylindrical surface 80 of the tubular handle 73 for receiving the spent pressurized fluid from the motor.

Figure 12:
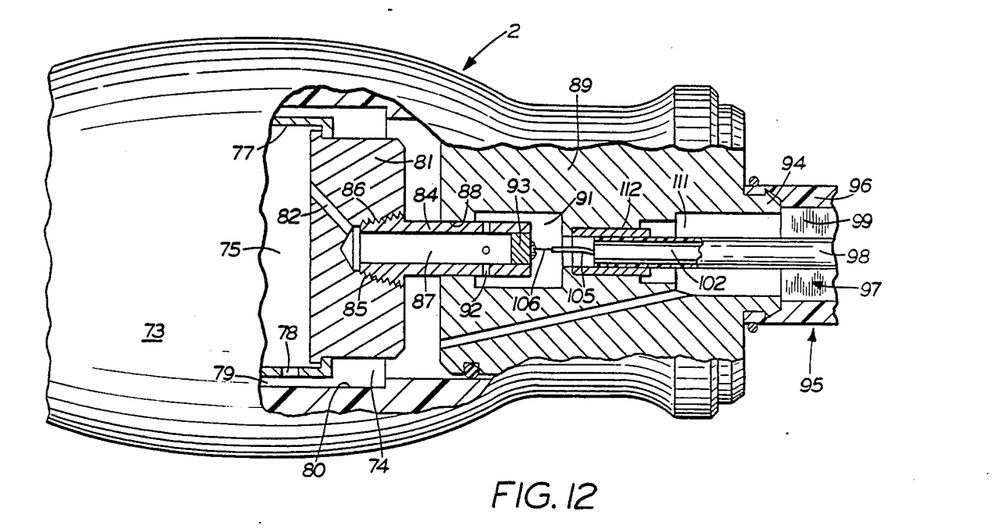
FIG. 12 is an enlarged fragmentary view with portions broken away and in section, showing the air pressure supply and exhaust hose connected to the rear portion of the air driven meat trimming knife of FIG. 7.

Motor 75 includes a fixed rear end plate 81 which is provided with a pressurized fluid inlet passage 82 and is mounted in a fixed position within handpiece bore 74. A tubular connector 84 has a threaded end 85 engaged within a complementary-shaped threaded opening 86 formed in end plate 81 and is formed with a bore 87 which communicates with fluid inlet passage 82. The opposite end of connector 84 is press fitted within an opening 88 formed in a rear body 89 which also is mounted in a fixed position within the rear end of handpiece bore 74. Connector bore 87 communicates with a chamber 91 formed in body 89 through a plurality of radially extending holes 92 formed in connector 84. The rear end of connector 84 is closed by a plug 93. Pneumatic meat trimming knife 2 is connected to a source of pressurized fluid, usually air, by an improved concentric inlet/exhaust hose indicated generally at 95, which is referred to throughout as the power supply line, in that it supplies the power to the hand tool as does power supply line 20 of electric knife 1.

Figures 9, 10:
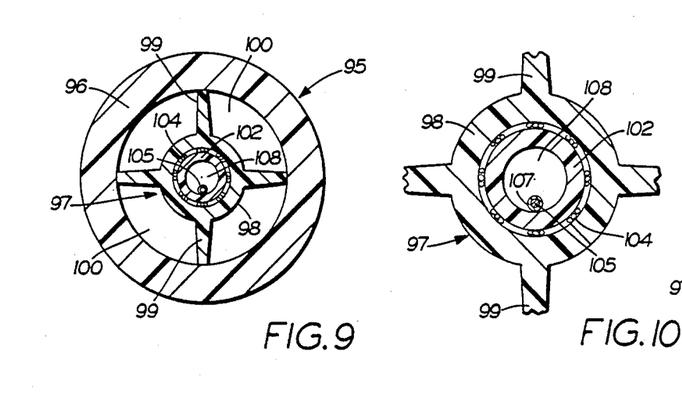
FIG. 9 is an enlarged sectional view taken on line 9—9, FIG. 7.
FIG. 10 is a further enlarged fragmentary view with portions in section, of the inner core of the air supply and exhaust hose of FIG. 9.
Figure 11:
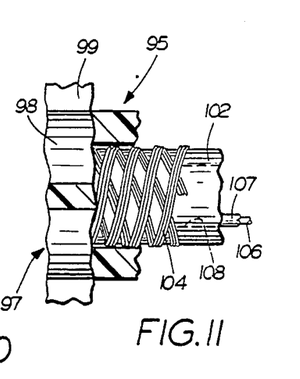
FIG. 11 is an enlarged fragmentary side view with portions broken away and in section taken of the air supply and exhaust hose of FIGS. 9 and 10.

Improved power supply hose 95 is shown in detail in FIGS. 9-11 and includes a cylindrical outer casing 96 preferably formed of a polyvinyl chloride (PVC), having a molded or extruded inner core indicated generally at 97 mounted therein. Core 97 has a hollow inner tube 98 which is formed integrally with a plurality of radially outwardly extending arms 99 which abut the inner cylindrical surface of outer casing 96 forming a plurality of segmental passages 100 through which the spent fluid is exhausted from within motor 75. Four equally spaced arms 99 are shown in the particular configuration of inner core 97 in order to provide four exhaust passages 100 extending circumferentially about inner tube 98. This number may vary without materially affecting the operation of hose 95.

An innermost tube 102 formed of a dielectric material has a metal wire braid 104 wrapped around the outer circumference thereof which is similar to braid 23 and dielectric tube 22 of electric trimming knife 1. Inner core 97 preferably is molded directly over tube 102 and braid 104. An insulated electrical conductor 105 having an inner metallic wire 106 and an outer insulated cover 107, extends throughout interior 108 of innermost tube 102.

Referring to FIG. 12, power supply hose 95 is attached to the rear of pneumatic trimming knife 2 by outer casing 96 being engaged with a stepped outer boss 94 which is formed integrally with rear body 89. Inner core 97, including tube 98 and radial arms 99, together with braid 104, terminates generally adjacent connector boss 94. Innermost tube 102 and conductor 105 continues through bore 111 of connector boss 94 and of rear body 89 and through a connector sleeve 112. Tube 102 preferably terminates at sleeve 112 and conductor 105 continues on with metal wire 106 being electrically connected to metal plug 93. The connection of conductor wire 106 with plug 93 provides an electrical circuit path from the conductor to the outer handpiece, and in particular to the front portion thereof through tubular metal connector 84, rear metal end plate 81 and the various metallic components of the air motor. The air motor is connected with the tubular body or handpiece of the knife which is grasped by an operator during a meat cutting operation.

Figures 7, 8:
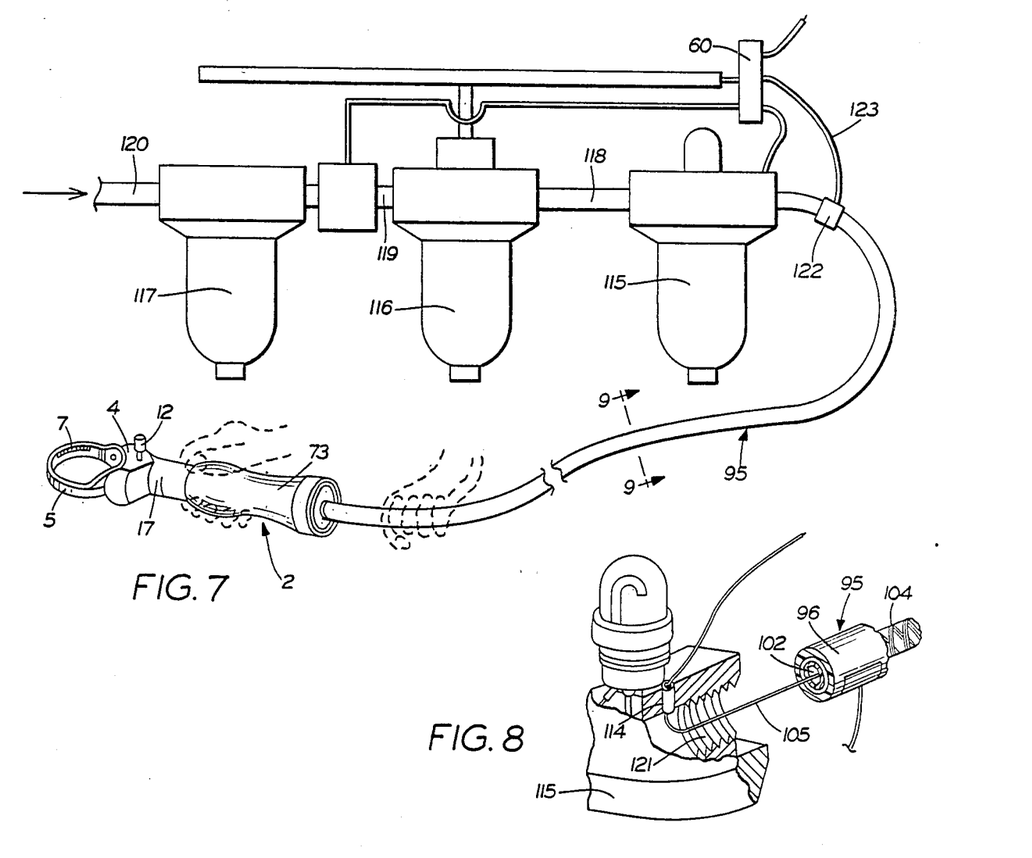
FIG. 7 is a perspective view similar to FIG. 1, showing an air driven meat trimming knife connected to a pressurized air supply system of the type to be controlled by the improved ON/OFF control system of the invention.
FIG. 8 is a fragmentary view with portions broken away and in section, showing the pressurized air line and internal electrical conductor thereof connected to a portion of the air supply components of FIG. 7.

Referring to FIG. 8, the opposite end of conductor 105 extends through a hole 114 formed in an air line lubricator 115 for subsequent connection to the control unit or, and in particular, printed circuit board 60 which is preferably mounted adjacent thereto in a usual type of secured housing such as that formed by housing plate 62 and 63 discussed above. Air line lubricator 115 is connected to a usual pressure regulator 116 and filter 117 through nipples 118 and 119 with an incoming air line 120 entering filter 117 and exiting air line lubricator 115 through threaded opening 121, to which is connected by usual attachment means, power supply line hose 95. Incoming air line 120 is connected to a compressor or to a main air line of a pneumatic system which extends throughout many industrial plants and, in particular, meat processing plants with which pneumatic trimming knife 2 will be used.

Thus conductor 105 provides an electrical path from printed circuit board 60 of the control system to the tubular handpiece. Metallic braid 104 terminates within the end of power supply hose 95 at the handpiece with the other end thereof being connected by a connector 122 and conductor 123 which also extends to the printed circuit board in a similar manner as does conductor 65 of electric trimming knife 1. Thus, two separate electrical paths are provided, one of which is connected to the handpiece and the other of which is connected to the power supply line or fluid hose 95. FIG. 13 shows diagrammatically in block diagram form the particular combination of electronic circuitry for actuating the improved control system of the invention and for carrying out the principles thereof.

Figure 1:
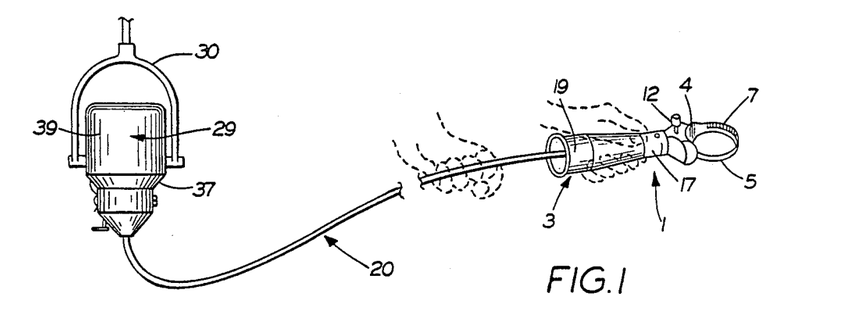
FIG. 1 is a perspective diagrammatic view showing an electrically driven meat trimming knife with an operator's hand being shown in phantom lines grasping the knife and power supply line.

In accordance with one of the main features of the invention, the operator must grasp both the handpiece and power supply line, as shown particularly in FIGS. 1 and 7, in the proper sequence before power is supplied to the handpiece through power supply lines 20 and 95. The handpiece must be grasped first, followed by the grasping of the power supply line before the handpiece is actuated, either by admitting the pressurized air into motor 75 or rotating flexible drive shaft 21, which will usually be accomplished by actuation of clutch 44 as shown in FIG. 3.

An operator to operate either of the knives, or other types of hand tools, will merely grasp the handpiece or handle of the tool and then upon grasping of the power supply line will actuate the appropriate power supply source. The operator can then relax his hand on the power supply line and the handpiece will continue to operate or be in the ON position so long as the operator maintains his grasp on the handpiece.

Immediately upon the operator releasing his grip on the handpiece, the power supply will be deactivated whether or not the operator is still grasping the power supply line. Correspondingly, should the operator first grasp the power supply line and then the handpiece, power will not be supplied to the handpiece. It is preferred for safety reasons that the operator first grasp the handpiece and then the power supply line to ensure that his hands are completely out of the way of the cutting blade or other work tool on the end of the power operated handpiece. Futhermore, once the handpiece has been actuated, the operator's other hand, which previously grasped the power supply line, is now free to manipulate the carcass of meat or other work piece being operated upon by the hand tool.

The inertia of the rotating mass for knife 1 consists principally of drive shaft 21, rotating blade 5, and the handpiece pinion gear, all of which are relatvely small. Air knife 2 includes the motor rotor. Therefore, almost instantaneously upon disengagement of the drive shaft through clutch 44, or shutting off of the pressurized air flow to hose 95, the blade will cease rotation thereby preventing possible injury to the operator and damage to the blade, even if the operator places the meat trimming knife directly on the work table. Upon re-energizing the handpiece by the sequential grasping of the handpiece and power supply line, the cutting blade is immediately rotated since the amount of force required for the small mass to be restarted is extremely small.

Therefore, an operator upon completing a meat trimming operation on a carcass may momentarily release his grip on the handpiece, which will immediately stop the rotation of the cutting blade without reaching overhead to disconnect the main electric drive motor as heretofore required, or without releasing the control lever for a pneumatic knife. Correspondingly, to re-energ,ize the knife the operator merely picks up the handpiece in one hand and then grasps the power supply line with the other hand which automatically starts the motor by the electronic circuitry described below. Therefore, the operator may conveniently release his grip on the handpiece and lay it on the worktable numerous times throughout a work period thereby reducing fatigue and increasing the efficiency of the operator and correspondingly increasing the meat production. The improved control system also reduces the continuous running of various moving parts of the handpiece and, correspondingly, increases the wear life thereof and decreases maintenance and replacement costs. The system further provides a "deadman switch" to the handpiece, that is, should the handpiece be accidentally dropped the power supply source is immediately disengaged from the handpiece. Also, the improved system removes all electrical components except the conductor wire and braid which carry a very low power frequency signal thereon. This enables the handpiece to be free of possible shock hazards to the operator and enables the handpiece to be completely washed and sanitized after each work shift.

It is a further improvement over the other means of stopping and starting tools; i.e. levers or pushbuttons, as such devices require that the operator place his hands or fingers in a position which could cause fatigue in many operators due to the vast differences in hand sizes, finger lengths, etc. The improved control system requires only that the operator grasp the tool in the proper areas and in the proper sequence to effect operation, thus reducing the occurrence of fatigue.

A modified form of an assembly for attaching electric power supply line 20 to the electric drive motor 29 is shown in FIGS. 14–18. The lower end of outer housing 37 is formed with a threaded sleeve 155 which has an adaptor nut 156 engaged therewith. Output drive shaft 157, which is similar to drive shaft 40 discussed above, extends through gear housing wall 158 by means of a dielectric bearing 159 which is mounted within an outer sleeve 160.

A shaft adaptor sleeve 162 preferably formed of stainless steel (FIG. 18), has a partial bore 163 formed in the top end thereof into which drive shaft 157 is inserted and retained by a set screw 164. The lower end of adaptor sleeve 162 is formed with a partial bore 165 provided with four equally spaced openings 166 for receiving portions of retaining balls 167.

Figures 14, 15, 16, 17, 18, 19, 20:
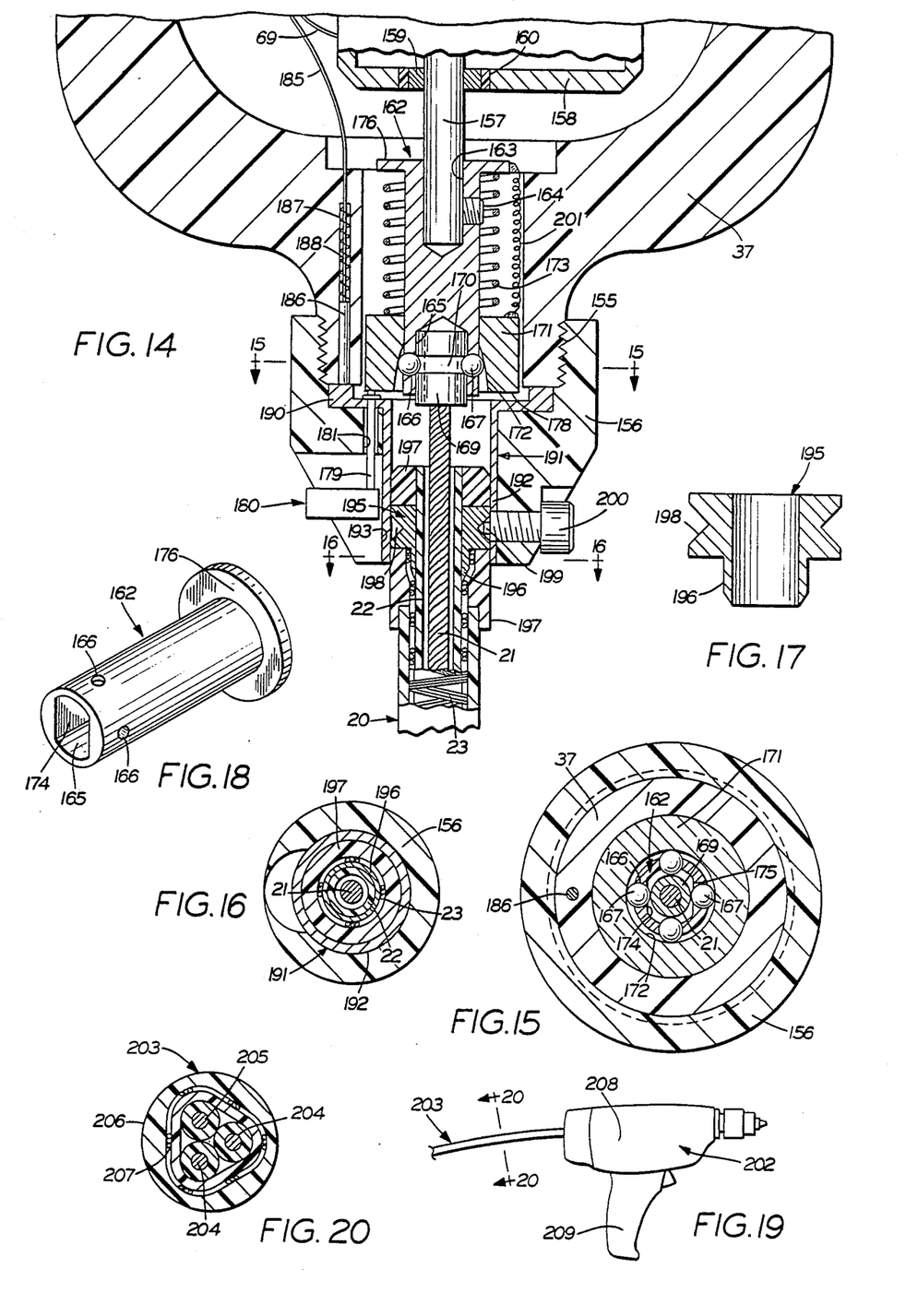
FIG. 14 is an enlarged fragmentary sectional view of a modified assembly for attaching the flexible drive shaft of the electric knife to the drive motor, similar to that shown in FIG. 3.
FIG. 15 is a sectional view taken on line 15—15, FIG. 14.
FIG. 16 is a sectional view taken on line 16—16, FIG. 14.
FIG. 17 is an enlarged sectional view of the flexible drive shaft casing ferrule.
FIG. 18 is an enlarged perspective view of the adaptor sleeve.
FIG. 19 is a perspective view of a usual hand drill controlled by the improved control system of the invention.
FIG. 20 is an enlarged sectional view taken on line 20—20, FIG. 19.

A metallic end fitting 169 is secured to the end of drive shaft 21 and is formed with an annular groove 170 for receiving portions of retaining balls 167 for securing end fitting 169 within bore 165. A sliding retention sleeve 171 is telescopically slideably mounted on the lower end of adaptor sleeve 162 and has a conical-shaped inner surface 172 which cammingly engages retaining balls 167 to force the balls through openings 166 and into engagement in annular groove 170 for clampingly securing end fitting 169 within bore 165.

Retention sleeve 171 is pressed into engagement with balls 167 by a coil compression spring 173 which is telescopically mounted about adapter sleeve 162. Bore 165 of sleeve 162 is formed with a pair of opposed flat surfaces 174 which are engaged with corresponding opposed flat surfaces 175 formed on end fitting 169 (FIG. 15) to provide the driving engagement between adaptor sleeve 162 and end fitting 169 when fitting 169 is secured within bore 165 by spring-biased ball detents 167. The upper end of adaptor sleeve 162 is formed with a collar 176 which serves as an upper abutment for coil spring 173.

The bottom annular edge 178 of retension sleeve 171 is engaged by a shaft 179 of a control member 180. Shaft 179 is slideably mounted within a passage 181 formed in adaptor nut 156. Upward movement of control member 180 will force shaft 179 upwardly and will move retention sleeve 171 upwardly enabling retaining balls 167 to move outwardly to disengage end fitting 169 from adaptor sleeve 172 and provide a quick disconnect engagement therebetween. Spring 173 will automatically engage retaining balls 167 with end fitting 169 upon reinsertion of the fitting within bore 165 of adaptor sleeve 162. Also, adaptor sleeve 162 is formed of an electrically conductive material, preferably metal, as is end fitting 169 to provide electrical contact with flexible drive shaft 21 and correspondingly with the hand tool rotatably driven thereby. An electrical conductor similar to conductor 69, is connected to shaft 157 by a commutator brush (not shown) located within the gear housing and extends to the printed circuit board 60 in a similar manner as shown in the embodiment of FIG. 3. A metal pigtail 201 is connected to and extends between collar 176 of adaptor sleeve 162 and retention sleeve 171 to insure a good electrical connection therebetween.

Metal braid 23 which forms the other control cable is electrically connected to printed circuit board 60 by an electrical conductor 185 which is connected to a metal pin 186 which extends through a passage 187 formed in motor housing 37. Pin 186 is biased into engagement with an outer annular flange 190 of a stainless steel adaptor ring 191 by a coil spring 188. Ring 191 includes a main cylindrical body 192 which is slideably engaged within a complementary-shaped bore 193 of adpator nut 156.

A stainless steel fitting 195 (FIG. 17) is formed with a cylindrical lower body 196 which is forced between metallic braid 23 and dielectric tube 22 and is secured in position by upper and lower injection molded plastic members 197. A V-shaped annular groove 198 is formed in fitting 195 and receives end 199 of a casing screw 200. This arrangement provides electrical contact between braid 23 through stainless steel fitting 195 and metal casing screw 200. Steel fitting 195 is pressed into engagement with stainless steel adaptor ring 191 by casing screw 200 which is connected to metal pin 186 and correspondingly to electrical conductor 185 to provide the other electrical path or cable. This circuit path or cable together with flexible diive shaft 21 provide the two paths and/or cables for the improved ON/OFF control system of the invention as described in further detail below. Also the embodiment described above provides a means for terminating the flexible drive shaft 21 and drive casing thereof in a satisfactory mechanical and electrical manner to provide both the necessary mechanical drive connection with the drive motor and the required electrical contacts for connection to printed circuit board 60.

A preferred embodiment of the electronic circuitry of the improved control system is shown diagrammatically in FIG. 13 and includes a plurality of subcircuits, each of which is represented by a labeled block. Hand tools 1 and 2 are connected by their respective electrical conductors, namely flexible drive shaft 21 and metal braid 23 and conductor 105 and braid 104 to an input diplexer 126 which is connected by conductors 127 and 128 to a capacitance sensing master oscillator 129. Oscillator 129 is connected by a conductor 130 to a digital noise filter and digital signal conditioner 131, which is connected by a conductor 132 to a digital detector 133, which is connected by a conductor 134 to an output diplexer 135. Output diplexer 135 is connected to a sequence detector 136 through a handle line 137 and cable line 138. The output of the sequence detector is connected to a power control subcircuit 139 by a conductor 140. Power control 139 is connected by a conductor 141 to a power supply 142 and to the device to be controlled, indicated at 143. Device 143 is clutch 44 of electric knife 1, a solenoid actuated valve or the like for pneumatic trimming knife 2, or other devices well known in the art.

A master timing control circuit 145 is connected to digital detector 133 through a conductor 146 and to the noise filter and signal conditioner 131 through conductor 147. Output diplexer 135 is connected by conductor 148 to an automatic error tracking circuit 149 which is connected to master timing control circuit 145 by conductor 150. Master timing control 145 also is connected with a diplex timing control circuit 152 by conductor 151. The outputs of control circuit 152 are fed through conductor 153 to input diplexer 126 and through conductor 154 to output diplexer 135. Diplexing could also be accomplished with signals coming directly from the mater timer, without the addition of a diplex timing control.

The following is a general description of the operation of the electronic circuitry of the improved control system which is shown in block diagram form in FIG. 13. The individual circuits represented by the various blocks can vary and the particular designs thereof are well known to those skilled in the art. Therefore, the particular circuitry is not shown in greater detail. The following operation sequence of the control system is discussed with respect to electric trimming knife 1, since the operation of the various circuits are similar for pneumatic trimming knife 2, or other powered hand tools.

Input and output diplexers 126 and 135 select which line, that is, either the handpiece or the power supply line, which is to be connected to the main system since the entire system is capable of detecting a change in only one of these components, that is, either the flexible shaft of the supply line or the handpiece at one time, but there is a need to sense both members independently. When the meat trimming knife is in an at-rest position, that is, motor 29 is running, but the cutting blade 5 is not rotating since clutch 44 is disengaged, the control system tells the power control 139 not to connect the electric power supply 142 to energize clutch 44. As long as an operator's hands do not grip the handpiece and power supply line in the appropriate sequence, it will remain OFF. While in this at-rest state the control system is looking for a signal change in either the power supply line or the handpiece caused by gripping of a hand around the particular component. The function of capacitance sensing master oscillator 129 is to generate a wave form of extremely low power, for example 800 khz, and place it on the particular conductor, either flexible drive shaft 21 or reinforcing metal braid 23 selected by input diplexer 126. The frequency and power level of the oscillator are of such a nature as to be susceptible to a human hand surrounding the sensing component.

With no operator hands near either the handpiece or power supply line the capacitance sensing master oscillator frequency and amplitude remain constant. The input and output diplexer switches input lines rapidly between the handpiece and supply line and the entire rest of the system sees no change created by the nearness of a hand. The digital noise filter and signal conditioning circuit 131 looks at the incoming signal from the master oscillator 129 and determines if there is excessive electromagnetic noise or other unwanted additional signals. It also detects changes in frequency beyond that which would be created by the proximity of a human hand. If the percentage of change is too great to be a human hand, but is instead caused by electromagnetic interference created by the motor or rotating flexible shaft or other nearby sources, the noise filter 131 does not allow that signal to pass on to the rest of the system. If the noise filter sees that no change has occurred from the master oscillator because no hands are near either of the components, and if it sees that there is not a large amount of unwanted electromagnetic interference it will allow the oscillator signal to pass on to digital detector 133.

During this at-rest state there is usually not a perceptable amount of electromagnetic interference and there is no frequency change caused by the nearness of a hand since there is no hand nearby at that time. At this time digital detector 133 counts the frequency coming from master oscillator 129 and sees no perceptable change in frequency caused by a human hand. At this time the combined diplex timing control 152 and digital detector 133 inform output diplexer 135 that there is no detectable signal and it therefore outputs a digital OFF signal on both the handle line 137 and cable line 138 thereby telling sequence detector 136 that no sequence of any type has yet taken place. As a result, the sequence detector continues to output a digital OFF signal to the power control 139, and the power control in turn disconnects or keeps from connecting power to the device under control, such as clutch 44 as shown in FIG. 3. The purpose of the power control is a buffer/booster that is to amplify or boost the low power digital on/off output from decision circuit 136 into a power level sufficient to diive higher power consumption devices, such as power tool motors or other equipment.

When a hand is placed around the handpiece the system detects that change internally but "waits" to see if a second hand is placed on the power supply line in proper sequence before switching the cutting blade on while continuing to see the hand as long as the hand stays near. When input diplexer 126 is connecting the handpiece to the rest of the system the rest of the system cannot detect a change until a hand is brought near the power supply line.

Input diplexer 126 allows capacitance sensing oscillator 129 to be connected to the handpiece. The frequency placed on the handpiece is modified by the presence of a hand upon it and the proximity of the hand results in a slight phase/frequency shift of the signal placed on the handpiece. As a result the output signal of the sensing oscillator changes slightly.

The digital filter 131 checks the signal to see if it is an acceptable change caused by a hand and to see if there is an excessive amount of unwanted electronic noise in the signal. As long as there is no excess of noise and there is a change within acceptable limits caused by the proximity of a hand, the filter passes the signal on to digital detector 133. The digital detector counts the frequency change and outputs a digital ON signal to the output diplexer 135. The output diplexer also will be receiving a signal from diplex timing control 152 which will tell the output diplexer that the hand signal must be coming from the handpiece and therefore must place the digital ON signal from the digital detector 133 on the handle line which will further be outputted to the sequence detector 136. The sequence detector will only output a signal upon completion of the appropriate changes of its input lines which has not yet occurred and will, therefore, have no output at this time. Since the digital detector has no output, power control 139 will also remain off and therefore, clutch 44 will remain disengaged.

The diplex timing control 152 rapidly switches which component, i.e. the handpiece or power supply line, is connected to the capacitance sensing oscillator 129. During the period of time that it is connected to the power supply line, master oscillator 129 will not change until a hand comes near the supply line even if a hand is already present on the handpiece.

The following sequence is followed when one hand is still on the handpiece as described above. As the hand is placed on the power supply line while input diplexer 126 is connecting the supply line to master oscillator 129, the frequency will be slightly modified. The output frequency of the oscillator will also be modified which is sent on to filter and conditioner 131. If the frequency is within acceptable change limits filter 131 allows the signal to pass on to digital detector 133. If the detector counts the appropriate frequency change it will output a digital ON signal. Diplex timing control 152 will be sending a signal to output diplexer 135 at the same moment that detector 133 outputs a digital ON signal. The output diplexer will therefore place the digital ON signal on the cable line output 138.

The sequence detector 136 will now see that it has an input on cable line 138 and it will also know that it still has a signal on handle line 137 which was there prior to the cable line signal. The next step of the sequence is to remove the hand which is on the supply line while maintaining the other hand on the handpiece. At this time the capacitance sensor is connected to it. The digital noise filter checks to confirm that the signal is appropriate and sends it on to detector 133 and then to output diplexer 135 while diplex timing control 152 further informs output diplexer 135 to output a digital ON signal on handle line 137 and an OFF signal on cable line 138. Since the sequence is appropriate, i.e. the operator has placed first one hand on the handpiece and then the other hand on the power supply line, then remove the hand on the power supply line while maintaining the other hand on the handpiece, the sequence detector now outputs a digital ON signal indicating that the appropriate device should be switched on and a signal is also sent to the input of power control 139. The power control amplifies the low power digital ON signal to a level sufficient for operating the solenoid valve, power hand tool or clutch 44 which will connect drive shaft 21 to motor output shaft 40 to rotate cutting blade 5.

Assume that the operato maintains his or her hand on the handpiece but removes the other hand from the power supply line. Since diplex timing control 152 switches back and forth several times a second it will give the entire system a chance to survey both the handpiece and power supply line several times a second. Each time the system checks the handpiece it will continue to output a signal on handle line 137 of output diplexer 135. Each time, however, the system checks the power supply line it will see that there is no longer a hand applied thereto. Therefore, the digital output on cable line 138 of the output diplexer will switch off. Sequence detector 136 sees a signal still on the handle line and remembers that cable line was on previously. Therefore it maintains an ON signal at its output which is further sent to the power control 139. The power control continues to switch the device to the ON position, that is, maintain clutch 44 engaged, and the solenoid valve energized or other devices controlled thereby.

Each time capacitance sensing oscillator 129 is connected to the power supply line with a hand on it, the oscillator frequency shifts slightly from normal. The digital filter senses an excessive change not created by erroneous sources and only lets the changes through if they seem appropriate. If the changes are appropriate, the digital filter outputs the signal to the digital detector at which time it outputs a digital ON signal to the output diplexer. The combination of diplex timing control, input diplexer, and output diplexer, are used to alternate the two sensing mediums 129 and 131 onto only one sensing system, and in effect, alternately connects the handpiece to handle line 137 and the power supply line to the cable line 138 several times a second. The effective results are that the two separate sensing mediums, namely the handpiece and power supply line, have independent or two separate systems.

Sequence detector 136 determines if the sequence in which the sensing lines were handled was correct and, if it was, it will switch on power control unit 131 which will actuate clutch 44 or other control component. This will in turn switch the meat cutting blade on. Once it is activated the knife will stay on as long as one hand only is maintained on the handpiece. One hand only on the power supply line will switch the unit off as well as removing the hand which is on the handpiece, whether or not a hand is on the power supply line at that time. This is due to the sequence detector seeing that the proper sequence has been broken. Once the proper sequence has been broken and the system returns to its rest state it must be switched on using only the correct sequence again, i.e. one hand on handpiece, then the remaining hand on the power supply line, then removing the hand from the supply line, or it will not restart. This is a built in safety feature which reduces dangerous operation making it more difficult to cause injuries with the power tool.

While noise filter 131 should be able to filter out more than one type of electromagnetic noise due to its design, its primary function is to eliminate electrical noise generated by the rotation of the cutting blade and internal moving drive shaft 21 when engaged, since the motion of the blade makes continuous stable electrical contact with the input diplexer 126 difficult, its ohmic contact changes frequently while the blade is in rotation. Frequency shift are also created by the rotation, flexing and shape changes of the drive shaft and cable supply line while in operation. As a result there are multiple frequency shifts created in the capacitance master sensing oscillator 129 which are sometimes well beyond the percentage of frequency shifts created by the proximity of a hand. These spuratic frequency shifts caused by blade and drive shaft rotation would be interpreted as hand signals and the digital detector would therefore act as if it were still detecting a hand on the handpiece even after the hand is removed. This would cause a failure of the system to shut down since it would continue to see a hand as long as the blade is in rotation whether or not the hand is actually present. Therefore, it is the function of the digital filter 131 to determine if the changes which the master oscillator senses are due to the presence of a hand or drive shaft rotation noise. It should also filter other types of electromagnetic noise. If the filter sees excessive noise it does not permit the signal to move on to the digital detector and therefore, will not permit it to create a digital ON signal. Since there are several samples per second the filter will stop any sample which has excessive noise while it may allow the next sample to pass through if the following sample has less noise than the previous sample. Because noise is erratic by nature there will be random samples which are valid and random samples which are not. The digital detector is capable of seeing only one valid sample out of several invalid samples so that it will continue to know whether a hand is on the sensing mediums 129 and 130.

Since several sections within the main system must have timing synchronization, that is from circuit block to circuit block as well as internal to some circuits, it is necessary to guarantee that proper timing of each circuit is correct. Such timing is accomplished by master timing control 145.

It is the purpose of master timing control to synchronize the function of all other circuit blocks, i.e. such as to determine if the digital noise filter is receiving correct or erroneous signals because of the amount of change created by a hand is unwanted noise, also for the digital detector to know if there is enough of a change to warrant a digital ON signal being created, also the input and output diplexers switching simultaneously so that the handpiece input controls the handle line 137 and the power supply line input controls the cable line 138, and so that the automatic error tracking circuit corrects the digital filter and digital detector at the appropriate times.

While master timing control 145 controls most of the rest of the system, both it and the automatic error tracking circuit 149, are ultimately controlled by the output of the master oscillator, while the master oscillator provides a master timing signal it has no ability to directly control other circuit blocks. Master timing control 145, however, interfaces and controls timing of most of the rest of the system.

It is the purpose of the automatic error tracking circuit to adjust the master timing control, digital noise filter, and digital detector so that any changes in master oscillator 129 caused by temperature change, aging, slight differences in parts tolerances, humidity, mechanical jarring, etc., are automatically compensated for in each set of circumstances for each hand tool. This circuit continues to operate regardless of sequence of handling. It does contain, however, an automatic frequency control which also acts as an automatic gain control both of which automatically set the sensitivity threshold for touch for hand tool controls.

Since there are differences from hand tool to hand tool in parts tolerance as well as environmental differences such as temperature, the most efficient tracking system is one in which the inner and outer cable lengths are electronically compared. Since changing the amount of power supply line length (braid 23) will change the master oscillator approximately the same amount as an equal change in inner cable length (shaft 21) connected to the handpiece, the effective change of master oscillator freuuency will be nearly identical when each is sensed. Therefore, this system constantly compares the two to each other, when ambient temperature changes cable size and thus master oscillator frequency, the frequency shift caused is nearly identical for each input line. Only if there is an offset in frequency which cannot be accounted for by humidity, temperature, machine vibration, etc., they will not track equally.

It can then detect extremely small difference when only one hand is placed on one input line while at the same time they can both vary drastically by reason of temperature but the control system will only see the change caused by a single hand. This does not work as well, of course, when both hands are used (one on each line) but when the first hand is placed on the handpiece and when it remains on the handpiece after the unit is on it is less difficult to sense frequency changes caused by a hand on one input line when there is no hand on the other line. This is especially critical during the time the cutting blade is engaged, since during that time the motion of the blade creates much spurrous and spuratic electrical noise. Although much noise is created while running the average number of pulses created by a hand near the blade, still can be compared to the average number of pulses created with no hand near the other input line or metal braid 23. It is this comparison then which allows automatic tracking of the changes of slight tolerance differences in components, temperature, humidity and possibly other variables, while still being able to sense very slight differences created by a hand.

Thus the improved control system of the invention provides a system whereby the operator of a power hand tool can actuate the ON/OFF control for the unit by merely placing his hands on the tool and power supply line in a predetermined sequence and can deenergize the tool easily be releasing his grip on the tool thereby providing ease of operation of the hand tool and, most importantly, increased safety for the operator thereof.

Although the above description is with respect to an electrically and pneumatically operated meat trimming knife, the concept of the invention is equally applicable to other types of power driven hand tools. As an example FIG. 19 shows a usual electric drill 202 which is connected to a source of electric power by a power supply line 203. Supply line 203 includes the usual pair of insulated electrical conductors 204 which supplies 120 volts AC power to a motor mounted within drill 202. In addition to conductors 204, another insulated conductor 205 is mounted within an outer protective covering 206. These conductors are also mounted within a metallic braid 207. Braid 207 is similar to previously described metal braids 23 and 104 and supplies one of the control circuit paths. Conductor 205 is similar to flexible drive shaft 21 and internal conductor 105 of trimming knives 1 and 2, respectively, and provides the other control circuit path. In the embodiment shown in FIGS. 19 and 20, braid 207 will be connected to one part of the electric drill such as outer casing 208, with electrical conductor 205 being connected to a second part of the drill, such as handle 209.

Thus, to operate electric drill 202 the operator merely grasps handle 209 and upon grasping outer casing 208, will energize the motor contained therein in a similar manner described above with respect to trimming knives 1 and 2. Preferably the operator must first grasp handle 209 and then outer casing 208. Thus the invention need not be limited to an operator grasping the supply line, per se, so long as two separate electrically isolated portions of the hand tool are gripped in a predetermined sequence by the operator.

Accordingly, the improved control system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved control system is constructed and used, the characteristics of the construction, and the advantageous, new and useful results obtained; the new and useful structures, devices, elements, arrangements, parts and combinations, are set forth in the appended claims.

What is claimed is:

1. A control system for a power operated hand tool which is connected to a power source by a power supply line extending between the power source and the hand tool, said system including:
   (a) first means for applying a signal alternately to the hand tool and supply line;
   (b) second means for detecting a change in said signal upon a user grasping the hand tool and supply line;
   (c) third means for determining the sequence of said user grasping the hand tool and supply line; and
   (d) fourth means for connecting the hand tool to the source of power upon the proper grasping sequence being determined by said third means.

2. The control system defined in claim 1 in which the first means includes diplexing circuits.

3. The control system defined in claim 1 in which the second means includes a capacitance sensing oscillator circuit.

4. The control system defined in claim 1 in which the third means includes a sequence detector circuit.

5. The control system defined in claim 1 in which the fourth means includes a power control unit for amplifying a digital ON/OFF signal generated by the third means.

6. The control system defined in claim 1 in which the second means includes a signal conditioning circuit for filtering out extraneous signals not produced by a user grasping the hand tool and supply line.

7. The control system defined in claim 2 in which the diplexing circuit includes input and output diplexers switching between applying the signal to the hand tool and supply line.

8. The control system defined in claim 7 in which the diplex circuit further includes a timing control and digital detector operatively connected to the output diplexer.

9. The control system defined in claim 5 in which the power control unit further includes a relay for actuating an ON/OFF electrical contrll circuit for connecting the power supply to the hand tool.

10. The control system defined in claim 1 in which the hand tool is pneumatically operated; in which the power supply is pressurized air; and in which the power supply line is a hose containing an inner tube providing an air passage for delivering pressurized air from the air supply to the hand tool.

11. The control system defined in claim 10 in which the hose is formed with a plurality of internal air exhaust passages and first and second electrical conductors.

12. The control system defined in claim 11 in which the first conductor extends within the air passage of the hose; and in which the second conductor is a metal wire braid wrapped about the inner tube within the hose.

13. The control system defined in claim 12 in which the signal applied by the first means is alternately applied to the first and second conductors; and in which the first conductor is electrically connected to the hand tool.

14. The control system defined in claim 11 in which a plurality of exhaust passages are formed within the hose and are arranged concentrically about the pressurized air passage.

15. The control system defined in claim 1 in which the hand tool is a meat trimming knife having a circular cutting blade rotated by the power source.

16. The control system defined in claim 1 in which the power source is an electric motor and the power supply line includes a flexible shaft driven by the electric motor; in which the flexible shaft is rotatably supported within a tube formed of a dielectric material; and in which a wire braid is wound about the dielectric tube.

17. The control system defined in claim 16 in which the signal applied by the first means is alternately applied to the flexible shaft and wire braid; and in which the flexible shaft is electrically connected to the hand tool.

18. The control system defined in claim 17 in which the hand tool is a meat trimming knife having a handpiece with a ring-shaped cutting blade rotatably mounted on a front end thereof; in which the blade is rotated by a drive gear; and in which the flexible shaft is connected to the drive gear for rotating the cutting blade through said drive gear.

19. The control system defined in claim 16 in which the flexible shaft, dielectric tube and wire braid are contained within an outer plastic cover; in which a metallic contact segment is mounted on the plastic cover and is connected to the wire braid; and in which the contact segment is electrically connected to the first means for applying the signal to the supply line through the wire braid.

20. The control system defined in claim 16 in which the electric motor has an output shaft drivingly connected to the flexible drive shaft by a plurality of gears and a clutch; in which the fourth means includes a control unit for generating an ON/OFF signal; and in which said ON/OFF signal is applied to the clutch for operatively connecting and disconnecting the drive shaft to and from the motor drive shaft.

21. The control system defined in claim 17 in which the signal of the first means is applied to the flexible drive shaft through a conductor brush in contact with a rotating stub shaft connected to the drive shaft.

22. The control system defined in claim 21 in which the flexible drive shaft is maintained in contact with the stub shaft by a spring biased ball detent.

23. The control system defined in claim 16 in which the first, second, third and fourth means are embodied in a printed circuit board mounted adjacent the electric motor.

24. The control system defined in claim 21 in which the flexible shaft terminates in a metallic fitting which is maintained in electrical contact with an adaptor sleeve by a plurality of detent balls and a spring biased retention sleeve.

25. A method for actuating and deactivating a power driven hand tool which is connected to a power source by a power supply line by a user grasping the hand tool and power supply line in a predetermined sequence, said method including the steps of:
  (a) applying a signal alternately to the hand tool and power supply line;
  (b) manually grasping the hand tool and power supply line in a predetermined sequence;
  (c) detecting a change in said signal upon a user grasping the hand tool and supply line;
  (d) determining the sequence of the hand tool and supply line being grasped; and
  (e) actuating the hand tool by connecting it to the power source upon the proper grasping sequence being determined by said third means.

26. The method defined in claim 25 including the step of filtering out any extraneous signal applied to the hand tool and power supply line.

27. The method defined in claim 25 in which the signal is applied at a predetermined frequency; and in which the detectable change of said signal is effected by a change in capacitance of the hand tool and supply line when manually grasped.

28. The method defined in claim 25 in which the hand tool is actuated only if the hand tool is grasped prior to the power supply line being grasped.

29. The method define in claim 25 in which the hand tool once actuated is deactivated when the hand tool is released by the user of the hand tool.

30. The method defined in claim 25 including the step of determining whether the signal is being applied to the tool or to the supply line when said change is being detected; and then checking if an appropriate signal has been received indicating that the hand tool is being grasped when determining the sequence before actuating the hand tool.

31. An improved meat trimming knife of the type having a handpiece with a ring-shaped cutting blade rotatably mounted on a front end thereof, said blade being rotated by a power source remote from the handpiece and connected thereto by a power supply line, said knife including a pair of electrical conductor means extending through the power supply line and terminating at two separate locations adjacent the handpiece for alternatively transmitting a low power frequency to said locations; circuit means for detecting a change of frequency in the two conductor means caused by a user of the handpiece grasping the handpiece and power supply line in a predetermined sequence; and means for connecting the power source to the handpiece for rotating the cutting blade upon sensing the grasping of the handpiece and power supply line in the predetermined sequence.

32. An improved ON/OFF control system for a power operated hand tool which is connected to a power source by a power supply line, said system including a pair of electrical conductor means extending through the power supply line, at least one of said conductors terminating within the hand tool; first means for transmitting low power frequency signals on the electrical conductor means; second means for detecting a change in said signals upon a user grasping areas adjacent the pair of conductors; and third means for connecting the source of power to the hand tool upon said change of frequency being detected by the second means.

* * * * *